United States Patent Office 2,921,933
Patented Jan. 19, 1960

2,921,933

MANUFACTURE OF POLYETHYLENE

Art C. McKinnis, Long Beach, and William D. Schaeffer, Pomona, Calif., assignors, by mesne assignments, to Collier Carbon and Chemical Corporation, a corporation of California No Drawing. Application March 18, 1957
Serial No. 646,549

17 Claims. (Cl. 260—94.9)

This invention relates to an improved process for the manufacture of polyethylene, and in particular relates to novel and advantageous methods for recovering polyethylene from the crude polymerizate obtained by polymerizing ethylene at relatively low temperatures and pressures under the influence of mixed metal catalysts.

According to the so-called "Ziegler process," polyethylene of high molecular weight is prepared by subjecting ethylene to relatively mild conditions of temperature and pressure, e.g., 1 to 100 atmospheres and 20°–150° C., in the presence of a catalyst prepared by admixing an aluminum alkyl or aryl with a reducible compound of a metal of groups IVb to VIb of the periodic table. The aluminum alkyl or aryl component of the catalyst may be an aluminum trialkyl or triaryl, e.g., aluminum triethyl aluminum tripropyl, aluminum tri-isobutyl, aluminum tri-octyl, aluminum tridecyl, aluminum triphenyl, etc., or one of the alkyl or aryl groups may be replaced by halogen, alkoxy or aryloxy, as in diethyl aluminum chloride, dimethyl aluminum methoxide, diphenyl aluminum chloride, dimethyl aluminum methoxide, diphenyl aluminum bromide, dimethyl aluminum phenoxide, etc. The heavy metal component of the catalyst is preferably titanium tetrachloride, but may be any reducible compound of titanium, zirconium, thorium, tantalum, chromium, vanadium, tungsten, etc. The exact chemical nature of the catalyst is not known, but since the two components thereof react immediately upon admixture it is clear that the catalyst itself constitutes some sort of a reaction product in which the heavy metal is present in a reduced state. In preparing the catalyst it is preferred to employ from 1 to 3n moles of the aluminum compound per mole of the heavy metal compound, where $n$ represents the valence of the metal in the latter. Thus, from 1 to 12 moles of, say, aluminum tri-butyl are preferably employed per mole of titanium tetrachloride. Within certain limits the molecular weight of the polyethylene can be controlled by varying the molecular ratio of the organo-aluminum compound and the heavy metal compound in the catalyst. The polymerization reaction is carried out in the presence of an inert liquid reaction medium which is preferably an aliphatic, cycloaliphatic, or aromatic hydrocarbon, e.g., pentane, hexane, heptane, gas oil, kerosene, Diesel fuel, cyclohexane, benzene, xylene, etc. Conveniently, the organo-aluminum compound is dissolved in the reaction medium and the heavy metal compound is added gradually while dissipating the exothermic heat of reaction. In most cases the catalytic reaction product is only slightly soluble in the reaction medium so that for the most part the product so prepared comprises a suspension of the catalytically active material in the liquid medium. This product is placed in a pressure vessel and ethylene is introduced into the vessel under the desired pressure. The vessel and contents are then heated at the desired reaction temperature until the pressure within the vessel drops to a low fixed value, indicating completion of the polymerization reaction. The crude polymerizate is then removed from the vessel and is treated to separate the catalyst and reaction medium from the polymer product. For a more detailed description of the Ziegler process, reference is made to Belgian Patents Nos. 533,362; 534,798; and 540,459; and Australian specification No. 11,239/55.

The process of the present invention is concerned with the last step mentioned above, i.e., with the step of recovering the solid polyethylene product from the crude polymerizate. As stated, the latter consists of a mixture of polymerized ethylene, catalyst and liquid hydrocarbon. In order to obtain a substantially ash-free, odorless, colorless, high molecular weight product which can be molded without substantial corrosion of the mold dies, it is essential that the separation of catalyst, hydrocarbon, and low molecular weight polymer from the high molecular weight polymer be as complete as possible. In the past, such separation has been accomplished by treating the crude polymerizate with an aliphatic alcohol to "kill" the catalyst, i.e., to destroy the catalyst activity and insure stoppage of the polymerization reaction, and then filtering off the solid polymer and repeatedly washing the latter with an alcohol to remove the "killed" catalyst, traces of the reaction medium, and low molecular weight polymers. Such procedure, however, is disadvantageous in that it requires the use of relatively large volumes of alcohol for "killing" the catalyst and washing the polymer and, more seriously, it does not consistently lead to the production of a substantially odor-free, ash-free, non-corrosive polyethylene product.

It is accordingly an object of the present invention to provide an improved process for the manufacture of high molecular weight polyethylene.

Another object is to provide an improved method for treating Ziegler-process polymerizates to recover substantially odor-free, ash-free, non-corrosive high molecular weight polymers therefrom.

A further object is to provide an improved method for separating the catalyst and polymerization medium from the crude polymerizate obtained in polymerizing ethylene in the presence of a catalytically active reaction product of an organo-aluminum compound and a reducible compound of a metal of groups IVb–VIb of the periodic table.

Other and related objects will be apparent from the following description of the invention, and various advantages not specifically referred to herein will occur to those skilled in the art upon employment of the invention in practice.

We have now found that the above objects and related advantages may be realized by carefully controlling the temperature at which the crude polymerizate is "killed" and filtered and by properly selecting the media employed for "killing" the polymerizate and washing the polymer. More particularly, we have found that substantially odor-free, ash-free and non-corrosive high molecular weight polyethylene can be separated from crude Ziegler-process polymerizates by (1) "killing" the polymerizate at a temperature of at least about 60° C. with an aliphatic alcohol, (2) separating the solid polymer from the "killed" polymerizate at a temperature of at least about 60° C., (3) washing the separated polymer with a liquid hydrocarbon, and (4) washing the solid polymer with methanol or a mixture of hydrocarbon solvent and methanol. Optionally, the solid polymer is given a third washing with hydrocarbon, hydrocarbon-methanol mixture, or water. We have found that such procedure not only produces a superior polyethylene product but also reduces to a minimum the amount of alcohol required, and hence reduces the magnitude of the solvent recovery problem. The hydrocarbon solvent employed for washing the polymer may be the same as that employed as the inert reaction medium in effecting the polymerization reaction, thus obviating the need for a special system to recover such solvent.

The present process is generally applicable to Ziegler ethylene polymerizates, i.e., to the mixtures of reaction medium, catalyst, and polyethylene obtained by subjecting ethylene to polymerizing conditions in the presence of a Ziegler catalyst and an inert liquid hydrocarbon reaction medium. The term "Ziegler catalyst" is herein employed to designate a material which essentially comprises reaction products of unknown constitution formed at ambient temperatures by reaction between organoaluminum compounds and reducible compounds of metals of groups IVb-VIb of the periodic table, and which is capable of effecting the polymerization of ethylene to an average molecular weight above about 10,000 (as determined by viscosity measurement) at pressures below about 100 atmospheres and at temperatures of 20°-150° C. As employed commercially, such catalysts are preferably formed by reaction of titanium tetrachloride with an aluminum compound selected from the class consisting of aluminum trialkyls and dialkyl aluminum halides. However, the process of the invention is not limited in its applicability to polymerization processes in which such preferred Ziegler catalysts are employed. Similarly, while the inert liquid reaction medium is preferably a petroleum hydrocarbon of low to medium boiling range (60°-250° C.) e.g., hexane, heptane, octane, gas oil, kerosene, or diesel fuel, the applicability of the process is not limited to use of such preferred materials. Likewise, applicability of the present process is not limited to the particular conditions of pressure and temperature under which the polymerization reaction itself is carried out.

Considering now the process of the invention in detail, the most essential feature thereof lies in treating the crude polymerizate with an aliphatic alcohol at a temperature between about 60° C. and about 150° C. Since it is usually more convenient to operate at atmospheric pressure, it is preferred to employ alcohols whose normal boiling points are substantially above the temperature at which the treatment is effected. Aliphatic monohydric alcohols containing from 3 to 12 carbon atoms, e.g., n-propanol, n-butanol, iso-amyl alcohol, iso-heptanol, undecanol, etc., are preferred although polyhydric alcohols such as ethylene glycol, propylene glycol, diethylene glycol may be employed if desired. Ethyl alcohol may be employed at atmospheric pressures, particularly at the lower temperatures within the stated range, although its use entails some inconvenience by reason of its relatively high vapor pressure at such temperatures, and methanol may be employed by operating at slightly elevated pressures, e.g., 30 p.s.i.g.

Within limits, the effectiveness of the alcohol treatment is proportional to the temperature at which the treatment is carried out. However, at temperatures above about 150° C., the hydrocarbon reaction medium may exert considerable vapor pressure and, more importantly, the physical properties of the polyethylene product may be adversely affected. At temperatures below about 60° C., the polyethylene product is unsatisfactory from the standpoint of corrosion, odor and ash. Accordingly, while the alcohol treatment may be carried out at any temperature between about 60° C. and about 150° C., it is preferred to operate at temperatures between about 80° C. and about 100° C.

The treatment itself consists simply in admixing the alcohol with the crude polymerizate while maintaining the temperature within the limits stated above and while excluding oxygen from the system. As practiced commercially, the Ziegler process for polyethylene is effected at temperatures of about 65° C.-100° C. The catalyst is prepared in situ in the hydrocarbon reaction medium, and the ethylene reactant is passed into the catalyst suspension at the desired temperature and pressure until it is no longer absorbed. The crude polymerizate is thus initially produced at a temperature between about 65° C. and about 100° C. When proceeding in accordance with the present process, the alcohol treatment may be effected in the polymerization vessel itself or in a separate treating vessel into which the polymerizate is transferred. In either case it is essential that the polymerizate not be permitted to cool to below about 60° C. before being treated with the alcohol. It is also necessary that oxygen be excluded from the system. According to a preferred mode of operation, the crude polymerizate is transferred from the polymerization vessel to a suitable closed treating vessel by the application of nitrogen under pressure, and the treating vessel and transfer conduit are thermally insulated to avoid loss of heat from the polymerizate. As stated, the alcohol treatment is preferably effected at 80°-100° C. Accordingly, if the polymerization reaction is effected at a temperature below about 80° C., it is desirable that the treating vessel be equipped with heating means for raising the temperature of the polymerizate to the desired treating temperature and for maintaining such temperature during the course of the treatment. Also, the treating vessel should be equipped with an efficient stirring device to insure complete admixture of the alcohol and the polymerizate.

The amount of alcohol employed in treating the polymerizate must of course be sufficient to destroy completely all catalyst activity, but in the interests of economy should not greatly exceed such amount. One of the important advantages of the present procedure lies in the fact that the amount of alcohol required to destroy the catalyst activity is very substantially less than that required when operating at lower temperatures. For the most part, the optimum amount of alcohol will vary according to the quantity of catalyst present in the polymerizate, but under conventional operating conditions the amount of alcohol employed will be between about 1 and about 10 percent by volume of the polymerizate.

The duration of the alcohol treatment, i.e., the time required for the alcohol to destroy the catalyst activity, is primarily dependent upon the temperature at which said treatment is effected. When operating at temperatures of 85° C. and above, very satisfactory results can be obtained by agitating the polymerizate with the alcohol for as little as ten minutes, whereas at 60° C. equivalent results are attained only by prolonging the treatment for about 1 hour. In general, then, the alcohol treatment should extend over a period of between about 10 minutes and about 1 hour, with the shorter times being effective at higher operating temperatures, and vice versa. However, no adverse effects are discernible if such treating periods are exceeded, and when operating within the preferred temperature range of 80°-100° C. we prefer to agitate the polymerizate with the alcohol for about 0.5 hour.

The second essential step in the process consists in separating the solid polyethylene from the "killed" polymerizate while continuing to maintain the temperature within the aforesaid limits. It is not necessary, however, to continue to exclude oxygen from the system. Such separation may be effected either by filtration or centrifuging. Except for effecting it at an elevated temperature, the separation step is entirely conventional, and any of the various techniques and equipment for separating solids from liquids while maintaining an elevated temperature may be employed.

The third essential step of the process consists in washing the solid polyethylene filter cake with a liquid hydrocarbon. This operation need not be carried out at an elevated temperature, and it is usually most convenient simply to wash the polyethylene at whatever temperature is attained by natural cooling and loss of heat from the equipment employed, i.e., it is not necessary to effect positive cooling or to avoid loss of heat. In the interests of reducing the number of materials employed in the overall production process, it is preferred that the hydrocarbon washing medium be the same as the hydrocarbon reaction medium employed in the polymerization step, so that after purification (as by distillation) the washing medium can subsequently be employed either as such or as the polymerization reaction medium. Accordingly, the hydrocarbon washing liquid is preferably an aliphatic hydrocarbon which boils between about 60° and about 250° C. Suitably, between about 1 and about 10 volumes of the wash liquid are employed per volume of the solid polyethylene. If desired, the washing operation may be conducted by slurrying the polyethylene filter cake in the wash liquid and then separating the latter by filtration or centrifuging. However, we have found that equally satisfactory results are attained by the more simple procedure of washing the filter cake directly on the filter cloth or screen. In accordance with usual procedure, the wash liquid may be flushed through the filter cake in two or more separate portions.

The fourth step of our process consists in re-washing the solid polyethylene with either methanol or a mixture of methanol and hydrocarbon. Again, it is preferable to wash the filter cake as such rather than slurrying it in the wash liquid, and between about 1 and 10 volumes of the wash liquid are employed per volume of the polyethylene filter cake. When the methanol is employed in combination with a hydrocarbon, the volume ratio of methanol to hydrocarbon is suitably between about 1:3 and about 2:1 and is preferably about 2:3. It is permissible for the methanol to contain minor amounts, e.g. up to about 25 percent, of water.

As previously stated, the present process may optionally comprise a third washing step in which the washing liquid is either a hydrocarbon, a mixture of hydrocarbon and methanol, or water. Again, the hydrocarbon is desirably the same as the hydrocarbon reaction medium and/or the hydrocarbon washing liquid previously employed. On the other hand, it is also desirable that the hydrocarbon employed for the final wash be one of relatively high volatility in order that it may readily be completely removed from the polyethylene product when the latter is dried. Accordingly, if the hydrocarbon reaction medium and/or the first hydrocarbon wash liquid is relatively high boiling, e.g., gas oil or kerosene, it is preferred that a different hydrocarbon be employed for the final wash. Preferably, such hydrocarbon is one boiling below about 100° C., e.g., pentane, hexane, heptane, etc. When the final washing liquid is a mixture of hydrocarbon and methanol, such mixture may suitably comprise between about 25 and about 65 percent by volume of methanol and, correspondingly, between about 75 and about 35 percent by volume of hydrocarbon. As in the case of the prior washing steps, the final washing is preferably but not necessarily carried out directly on the polyethylene filter cake rather than by re-slurrying and filtering.

The desirability of effecting the final optional washing step depends upon the nature of the crude polymerizate, the desired purity of the polyethylene product, and the nature of the wash liquid employed in the preceding washing step. As is well known, the polymerization reaction is very sensitive to a variety of factors, and it is not entirely unusual for seemingly identical polymerization runs to yield crude polymerizates which differ appreciably with respect to the ease of recovering a substantially pure polyethylene product therefrom. Under optimum polymerizing conditions, there is produced a polymerizate from which very pure polyethylene can be recovered by applying the present procedure with omission of the final washing step. On the other hand, there are occasionally obtained polymerizates from which polyethylene of equal purity can be recovered only by inclusion of the final washing step. In such cases, such step will be included unless, of course, it is acceptable to produce a polyethylene product which is not quite so pure. Also, we have found that when the wash liquid employed in the second washing operation is substantially pure methanol rather than a hydrocarbon-methanol mixture, substantially improved results are attained by carrying out the third washing step as described above. In any case, however, application of the present process up to the final optional step will yield a more satisfactory product than prior art processes in which the present procedure is not followed.

Upon completion of the last washing operation, the polyethylene product is dried in the conventional manner, usually at a somewhat elevated temperature in a tray or drum-drier.

The following examples will illustrate several ways in which the principle of the invention has been applied, and will further illustrate the influence of the various controlled factors in the quality of the polyethylene product, but are not to be construed as limiting the invention.

*Example I*

Ziegler catalyst was prepared by dissolving 15 millimoles of diethyl aluminum chloride in 150 ml. of n-heptane while blanketing with dry nitrogen, after which 15 millimoles of titanium tetrachloride were added with stirring. The catalyst was allowed to age for 10 minutes, after which it was run into 1350 ml. of n-heptane which had been saturated with ethylene and heated to about 60° C. Ethylene was then passed into the mixture of catalyst and reaction medium at a rate which exceeded the rate of absorption by about 0.5-1.0 liter per minute, while maintaining the temperature at 60°-65° C. by means of an air stream directed against the outside walls of the polymerization vessel. When about 140 liters of ethylene had been absorbed (40 minutes), the crude polymerizate was transferred to a treating vessel under a blanket of nitrogen. While maintaining the temperature of the polymerizate at 60° C., 30 ml. of n-butanol were introduced into the treating vessel, after which the temperature was quickly raised to 80°-85° C. and held there for 10 minutes. The "killed" polymerizate was then filtered under applied vacuum while maintaining the temperature at about 80° C., and the filter cake was washed on the filter with 500 ml. of n-heptane. A second wash was made with a mixture of 300 ml. of n-heptane and 200 ml. of methanol, after which the polyethylene product was air dried at room temperature. The dried product weighed 170 grams and had an average molecular weight of about 63,000. It contained 0.00% ash, had only a slight odor at 100° C., and had a corrosion rating of 3. Said rating is determined by heating a sample of the polyethylene to about 315° C. and exposing a polished die steel plate to the evolved vapors for about 20 minutes. The plate is washed in toluene, and is then exposed to a humid atmosphere for about 2 hours, after which it is treated with hydrogen peroxide to oxidize the corrosion products to the ferric state. The amount of ferric iron is then determined colorimetrically and empirically translated to a corrosion rating value. When such value is below about 6, the polyethylene sample is considered non-corrosive.

*Example II*

A crude Ziegler polymerizate was prepared and transferred to a treating vessel as described in Example I. While maintaining the temperature at 60° C., 30 ml. of n-propanol were introduced into the treating vessel, after which the temperature was quickly raised to 80°-85° C. and held there for 10 minutes. The "killed" polymerizate was filtered under applied vacuum at about 80° C., and the filter cake was washed with 500 ml. of n-heptane. The washed cake was re-slurried in 1000 ml. of a 50-50 mixture of n-heptane and methanol, and was then filtered and given a final wash with 500 ml. of a 30-20 mixture of n-heptane and methanol. After air-drying at room temperature the polyethylene product, in the amount of 185 grams, had an ash content of 0.00%, only a slight odor at 100° C., and a corrosion rating of 7.

*Example III*

The procedure of Example II was followed through the step of filtering the "killed" polymerizate. The filter cake was washed, first with n-heptane, and then with methanol, and finally with water. After air-drying at room temperature, the polyethylene product contained 0.00% ash and had only a slight odor at 100° C. When the run was repeated omitting the final water wash, the product contained 0.03% ash and had a stronger odor.

*Example IV*

Example II was repeated, except that the heptane-washed polymer was re-slurried and washed with water rather than with heptane-methanol. The product had an unsatisfactorily high ash content.

*Example V*

The procedure of Example II was followed through the step of filtering the "killed" polymerizate. The filter cake was given a single wash with 500 ml. of 50–1 heptane-propanol, and was then air-dried to obtain a product having an unsatisfactorily high ash content and a corrosion rating of 17. This example illustrates the necessity for effecting the second washing step.

*Example VI*

Example I was repeated, except that the "killed" polymerizate was cooled to 35° C. before filtering. The air-dried product contained 0.09% ash and had a corrosion rating of 35. When the run was repeated, but with cooling of the "killed" polymerizate only to about 60° C. before filtering, the product contained 0.03% ash and had a corrosion rating of 6. This example illustrates the necessity for filtering the "killed" polymerizate at an elevated temperature of at least about 60° C.

*Example VII*

Example II was repeated, except that 10 ml. of methanol instead of 30 ml. of propanol was employed to "kill" the polymerizate. The air-dried product had an ash content of 0.01% and a corrosion rating of 9. A lower corrosion rating value can be achieved by employing a greater quantity of methanol and/or operating at a slightly elevated pressure in order to maintain a larger amount of the methanol in the liquid phase.

*Example VIII*

Example I was repeated, except that polymerizate was "killed" by heating with butanol at 60° C. for 1 hour rather than at 80° C. for 10 minutes. The air-dried product contained 0.01% ash.

Other modes of applying the principle of our invention may be employed instead of those explained, change being made as regards the methods or materials employed, provided the step or steps stated by any of the following claims, or the equivalent of such stated step or steps, be employed.

We, therefore, particularly point out and distinctly claim as our invention:

1. In a process for making solid polyethylene having an average molecular weight above about 10,000, wherein ethylene is subjected to polymerizing conditions in the presence of an inert liquid hydrocarbon reaction medium and a polymerization catalyst obtained by reacting a reducible compound of a metal of groups IVb to VIb, inclusive, of the periodic table with an organo-aluminum compound selected from the class consisting of aluminum trialkyls, aluminum triaryls, dialkyl aluminum halides and diaryl aluminum halides, whereby there is obtained a crude polymerizate comprising said polyethylene, active catalyst and said reaction medium, the improved method for recovering said polyethylene which comprises: (1) admixing an aliphatic alcohol with said crude polymerizate and maintaining the mixture so obtained at a temperature between about 60° C. and about 150° C. until the activity of said catalyst is destroyed; (2) separating the solid polyethylene from the so-treated polymerizate at a temperature between about 60° C. and about 150° C.; (3) washing the separated polyethylene with a liquid aliphatic hydrocarbon and separating the latter from the washed polyethylene; and (4) re-washing the polyethylene with a liquid selected from the class consisting of liquid aliphatic hydrocarbons and mixtures of methanol and liquid aliphatic hydrocarbons in a volume ratio between about 1:3 and 2:1.

2. A process as defined by claim 1 wherein the liquid aliphatic hydrocarbon employed in steps (2) and (4) is identical with the liquid aliphatic hydrocarbon reaction medium contained in the said crude polymerizate.

3. A process as defined by claim 1 wherein steps (1) and (2) are effected at a temperature between about 80° C. and about 100° C.

4. A process as defined by claim 1 wherein the aliphatic alcohol employed in step (1) is selected from the class consisting of a n-propanol and n-butanol.

5. A process as defined by claim 1 wherein the said polymerization catalyst is one obtained by reacting a reducible compound of titanium with a dialkyl aluminum halide.

6. A process as defined by claim 1 wherein the re-washed polyethylene obtained in step (4) is washed with a liquid selected from the class consisting of liquid aliphatic hydrocarbons, mixtures comprising between about 25 and about 65 percent by volume of methanol and between about 75 and about 35 percent by volume of a liquid aliphatic hydrocarbon, and water.

7. A process as defined by claim 2 in which the said liquid aliphatic hydrocarbon boils between about 60° C. and about 250° C.

8. A process as defined by claim 5 wherein the said reducible compound of titanium is titanium tetrachloride and the said dialkyl aluminum halide is a dialkyl aluminum chloride.

9. The process for preparing polyethylene which comprises subjecting gaseous ethylene to polymerizing conditions in the presence of an inert liquid aliphatic hydrocarbon reaction medium and a polymerization catalyst obtained by reacting a reducible compound of a metal of groups IVb to VIb, inclusive, of the periodic table with an organo-aluminum compound selected from the class consisting of aluminum trialkyls, aluminum triaryls, dialkyl aluminum halides, and diaryl aluminum halides, whereby there is obtained a crude polymerizate comprising solid polyethylene, active catalyst and said reaction medium; treating said crude polymerizate with an aliphatic alcohol at a temperature between about 60° C. and about 150° C. for a period of time sufficient to deactivate said catalyst; separating solid polyethylene from the so-treated polymerizate at a temperature between about 60° C. and about 150° C.; washing the separated polyethylene with a liquid aliphatic hydrocarbon; and re-washing the washed polyethylene with a liquid selected from the class consisting of methanol and mixtures comprising methanol and a liquid aliphatic hydrocarbon in a volume ratio between about 1:3 and about 2:1.

10. A process as defined by claim 9 wherein the said reaction medium and the said aliphatic hydrocarbon washing liquid are the same and boil between about 60° C. and about 250° C.

11. A process as defined by claim 9 wherein the temperature at which the crude polymerizate is treated with the said alcohol and the temperature at which the solid polyethylene is separated from the so-treated polymerizate are between about 80° C. and about 100° C.

12. A process as defined by claim 9 wherein the said aliphatic alcohol is selected from the class consisting of n-propanol and n-butanol.

13. A process as defined by claim 9 wherein the said polymerization catalyst is one obtained by reacting a reducible compound of titanium with a dialkyl aluminum halide.

14. A process as defined by claim 9 wherein the said polymerization catalyst is one obtained by reacting titanium tetrachloride with a dialkyl aluminum halide.

15. A process as defined by claim 9 wherein the rewashed solid polyethylene is washed with a liquid selected from the class consisting of liquid aliphatic hydrocarbons, mixtures comprising between about 25 and about 65 percent by volume of methanol and between about 75 and about 35 percent by volume of a liquid aliphatic hydrocarbon, and water.

16. The process for preparing polyethylene which comprises subjecting ethylene to a temperature between about 20° C. and about 150° C. and a pressure between about 1 and about 100 atmospheres in the presence of a liquid aliphatic hydrocarbon reaction medium and a catalyst obtained by reacting a reducible compound of a metal of groups IV*b* to VI*b*, inclusive, of the periodic table with an organo-aluminum compound selected from the class consisting of aluminum trialkyls, aluminum triaryls, diaryl aluminum halides and dialkyl aluminum halides, whereby there is obtained a crude polymerizate comprising solid polyethylene, said reaction medium and active catalyst; treating said polymerizate with between about 1 and about 10 percent by volume of an aliphatic alcohol at a temperature between about 60° C. and about 150° C. for a period of time sufficient to deactivate said catalyst; separating solid polyethylene from the so-treated polymerizate at a temperature between about 60° C. and about 150° C.; washing the separated polyethylene with a liquid aliphatic hydrocarbon; and rewashing the washed polyethylene with a liquid selected from the class consisting of methanol and mixtures of liquid aliphatic hydrocarbon and methanol in a volume ratio between about 1:3 and about 2:1.

17. A process as defined by claim 16 wherein the liquid aliphatic hydrocarbon reaction medium and the liquid aliphatic hydrocarbon washing medium are the same and boil between about 60° C. and about 250° C.

References Cited in the file of this patent

UNITED STATES PATENTS

| 2,692,258 | Roebuck et al. | Oct. 19, 1954 |
| 2,832,759 | Nowlin et al. | Apr. 29, 1958 |
| 2,845,412 | Heyson | July 29, 1958 |

FOREIGN PATENTS

| 533,362 | Belgium | May 16, 1955 |

Notice of Adverse Decision in Interference

In Interference No. 91,362 involving Patent No. 2,921,933, A. C. McKinnis and W. D. Schaeffer, Manufacture of polyethylene, final judgment adverse to the patentees was rendered Aug. 21, 1964, as to claims 1, 2, 3, 4, 5, 6, 7, 8, 9, 10, 11, 12, 13, 14, 15, 16 and 17.

[*Official Gazette December 22, 1964.*]